(12) United States Patent
McDonald et al.

(10) Patent No.: US 9,268,779 B2
(45) Date of Patent: Feb. 23, 2016

(54) METHODS, COMPUTER PROGRAM PRODUCTS, AND APPARATUSES FOR DISPERSING CONTENT ITEMS

(75) Inventors: Phillip McDonald, Alpharetta, GA (US); Basil P. Stieffen, Hampton, VA (US); Martin Miller, Alpharetta, GA (US); Alan R. Shealy, Roswell, GA (US); Kevin J. Green, Raleigh, NC (US)

(73) Assignee: McKesson Financial Holdings, Hamilton (BM)

( * ) Notice: Subject to any disclaimer, the term of this patent is extended or adjusted under 35 U.S.C. 154(b) by 273 days.

(21) Appl. No.: 12/361,314

(22) Filed: Jan. 28, 2009

(65) Prior Publication Data
US 2010/0191776 A1    Jul. 29, 2010

(51) Int. Cl.
  *G06F 7/00*     (2006.01)
  *G06F 17/30*    (2006.01)

(52) U.S. Cl.
  CPC ............................... *G06F 17/30097* (2013.01)

(58) Field of Classification Search
  CPC .......... G06F 17/30628; G06F 17/3033; G06F 17/30097
  USPC ................... 707/736, 821, E17.052
  See application file for complete search history.

(56) References Cited

U.S. PATENT DOCUMENTS

| | | | |
|---|---|---|---|
| 6,675,353 B1 * | 1/2004 | Friedman ..................... | 715/239 |
| 7,587,486 B2 * | 9/2009 | Taniguchi ..................... | 709/224 |
| 7,685,096 B2 * | 3/2010 | Margolus et al. ............. | 713/165 |
| 7,813,557 B1 * | 10/2010 | Bourdev ....................... | 382/205 |
| 8,239,445 B1 * | 8/2012 | Gage et al. .................... | 709/203 |
| 2003/0014637 A1 * | 1/2003 | Ellison et al. ................. | 713/178 |
| 2004/0006693 A1 * | 1/2004 | Vasnani et al. ................ | 713/168 |
| 2004/0220975 A1 * | 11/2004 | Carpentier et al. ........... | 707/200 |
| 2004/0236761 A1 * | 11/2004 | Both ............................. | 707/100 |
| 2005/0108433 A1 * | 5/2005 | Wu et al. ....................... | 709/246 |
| 2005/0131900 A1 * | 6/2005 | Palliyll et al. .................. | 707/10 |
| 2005/0198497 A1 * | 9/2005 | Kocher ......................... | 713/158 |
| 2005/0240531 A1 * | 10/2005 | Wolff, Jr. ........................ | 705/53 |
| 2005/0273832 A1 * | 12/2005 | Zigmond et al. .............. | 725/112 |
| 2006/0010095 A1 * | 1/2006 | Wolff et al. ........................ | 707/1 |
| 2007/0061706 A1 * | 3/2007 | Cupala et al. ................. | 715/513 |
| 2007/0118578 A1 * | 5/2007 | Ahrens et al. ................. | 707/205 |
| 2007/0244920 A1 * | 10/2007 | Palliyil et al. ................. | 707/102 |
| 2008/0022106 A1 * | 1/2008 | Singh et al. .................... | 713/176 |
| 2008/0201580 A1 * | 8/2008 | Savitzky et al. .............. | 713/189 |

(Continued)

OTHER PUBLICATIONS

U.S. Appl. No. 61/111,958, filed Nov. 6, 2008; In re: Steel et al.; entitled *Peer-to-Peer Redundant File Server System and Methods*.

(Continued)

*Primary Examiner* — James Trujillo
*Assistant Examiner* — Jessica N Le
(74) *Attorney, Agent, or Firm* — Alston & Bird LLP (57) ABSTRACT

An apparatus for dispersing content may include a processor. The processor may be configured to receive a request associated with a content item and generate a hashed identifier based at least in part on the request associated with the content item. The processor may further be configured to generate a respective container within a hierarchy of one or more containers based at least in part on the hashed identifier and store the content item in one of the one or more containers based at least in part on the hashed identifier. Associated methods and computer program products may also be provided.

27 Claims, 4 Drawing Sheets

(56) References Cited

U.S. PATENT DOCUMENTS

| | | | |
|---|---|---|---|
| 2008/0301457 A1* | 12/2008 | Uesugi et al. | 713/178 |
| 2009/0024795 A1* | 1/2009 | Kobara | 711/118 |
| 2009/0125701 A1* | 5/2009 | Suponau et al. | 711/216 |
| 2010/0058027 A1* | 3/2010 | Gong et al. | 711/216 |
| 2010/0098249 A1* | 4/2010 | Shin et al. | 380/44 |
| 2010/0313024 A1* | 12/2010 | Weniger et al. | 713/170 |
| 2012/0016883 A1 | 1/2012 | Nandy | |
| 2013/0066830 A1 | 3/2013 | Lacapra | |

OTHER PUBLICATIONS

U.S. Appl. No. 61/048,781, filed Apr. 29, 2008; In re: Lacapra; entitled *Peer-to-Peer Redundant File Service System and Methods*.

* cited by examiner

METHODS, COMPUTER PROGRAM PRODUCTS, AND APPARATUSES FOR DISPERSING CONTENT ITEMS

FIELD OF THE INVENTION

Embodiments of the invention relate generally to content management, and more particularly to methods, computer program products, and apparatuses for dispersing content items.

BACKGROUND OF THE INVENTION

With the advancement of technology, there has been an expansion with the amount of information available to users. Improvements have been made in the flexibility and immediacy of information transfer such as, for example, between various entities (e.g., users) via electronic devices. In this regard, information may be easily stored and/or transferred between electronic devices. With the large amount of information available, there has been a demand for increased storage capacity in devices to accommodate the storing of the large amount of information. Although there have been efforts to develop electronic devices that meet the demand to store large amount of information, problems still remain in the performance of these electronic devices when large amount of information are stored thereon.

In this regard, when large numbers of files are stored in individual directories on a file system, such as for example the New Technology File System (NTFS) system, the architecture of the file system can create issues with performance that can negatively affect an application attempting to access the files. A content repository that can store large numbers of files does not efficiently distribute the files to prevent issues with the file system that affect its performance. For example, a large number of files are sometimes stored in a first directory whereas only a limited number of files are stored in a second directory. As such, access to files in the first directory may be time-consuming, limited and/or prevented. Moreover, with the physical limitations of current file systems, there is a requirement that multiple folders be used to hold the content for one logical folder. These issues have been recurring for many years.

One technique to at least partially address to this problem may be to show the folders of the system to the user. However, this approach may lead to confusion of the user and may not be in accordance with the manner of submission of the content item by the user. Another technique may be to attempt to create a threshold or limit to the maximum number of files allowed in any single directory. This technique may require establishing limits on files to be stored in any single directory, monitoring the file storage, defragmenting directories when files are moved or deleted, and/or restoring the directories to be in-sync following an instance in which the directories were out of sync. As such, this potential solution may require the use and/or allocation of a large amount of resources which negatively affect the performance of the file system.

Accordingly, there may be a need to develop a directory structure that is capable of storing a large number and amount of content items and dispersing the stored content items throughout the directory structure in an equitable manner to avoid a performance degradation of the file system.

BRIEF SUMMARY OF THE INVENTION

Methods, apparatuses, and computer program products for dispersing content items are provided to store content items while taking into account the performance of the file system. In this regard, some embodiments of the invention may provide several advantages in content managing, and more particularly in the storage of content items. Embodiments of the invention may receive a request associated with a content item (e.g., create, store, modify, and/or the like). For example, a request to store a content item may be received, along with the content item to be stored. A hashed identifier may be automatically generated based at least in part on the request. The hashed identifier may include different information for each request. A hierarchy of one or more containers may be identified based at least in part on the hashed identifier. The hierarchy of containers may be modeled as a hierarchy of folders having a parent folder and in some instances one or more levels of "subfolders" logically residing "beneath" the level of the parent folder. The content item may be automatically stored in a folder based at least in part on the hashed identifier. Accordingly, content items may be stored automatically throughout a directory structure in a randomized fashion, in one embodiment, and may be dispersed in a relatively equal manner throughout the directory structure. As such, a large number and/or amount of content items may be stored on a file system without compromising its performance. Some embodiments of the invention may provide for administration of access permissions to manage user submission of and/or access to content items in a container.

In one exemplary embodiment, a method for dispersing content items is provided, which method may include receiving a request associated with a content item, and generating a hashed identifier based at least in part on the request associated with the content item. The method may also include identifying a respective container within a hierarchy of one or more containers based at least in part on the hashed identifier, and storing the content item in one of the one or more containers based at least in part on the hashed identifier.

In another exemplary embodiment, a computer program product for dispersing content items is provided. The computer program product includes at least one computer-readable storage medium having computer-executable program code instructions stored therein. The computer-executable program code instructions may include program code instructions for program instruction for receiving a request associated with a content item, and program code instructions for generating a hashed identifier based at least in part on the request associated with the content item. The computer-executable program code instructions may further include program code instructions for identifying a respective container within a hierarchy of one or more containers based at least in part on the hashed identifier, and program code instructions for storing the content item in one of the one or more containers based at least in part on the hashed identifier.

In yet another exemplary embodiment, an apparatus for dispersing content items is provided, which apparatus may include a processor. The processor may be configured to receive a request associated with a content item, and generate a hashed identifier based at least in part on the request associated with the content item. The processor may also be configured to identify a respective container within a hierarchy of one or more containers based at least in part on the hashed identifier, and store the content item in one of the one or more containers based at least in part on the hashed identifier.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "content item," "information" and similar terms may be used interchangeably to refer to data capable of being transmitted, received and/or stored in accordance with embodiments of the present invention, such as, for example, text file, media file, multimedia file, applications, and/or the like. The terms "automatic" or "automatically" may be used interchangeably to refer to an action performed in an automated manner without user intervention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Embodiments of the present invention may be employed in the context of content management, and more particularly in the context of storing content items. Embodiments of the invention may receive a request associated with a content item (e.g., create, store, modify, and/or the like). For example, a user may submit a content item and a request to store the content item. A hashed identifier may be automatically generated based at least in part on the request. The hashed identifier may comprise information associated with the date and time of the request and information associated with the device submitting the request at the time of the request and/or the device receiving and/or processing the request at the time of the request. For example, the hashed identifier may include the date of the request (e.g., the day, month, and year), the time of the request (e.g., the hour, minutes, seconds, and milliseconds), an address, such as an Internet protocol (IP) address, of the device submitting and/or processing the request at the time of the request, and/or a count of a random number generator associated with the device submitting and/or processing the request at the time of the request. As such, the hashed identifier may provide different or unique information for each content item based at least in part on the request. Each content item may be uniquely identified, and a hierarchy of one or more containers may be built.

The hashed identifier may provide information indicative of a hierarchy of one or more containers whereon the content item may be stored. As such, the hierarchy of one or more containers may be identified based at least in part on the hashed identifier. The hierarchy of containers may be modeled as a hierarchy of folders having a parent folder and in some instances one or more levels of "subfolders" logically residing "beneath" the level of the parent folder. For example, the hierarchy of folders may be organized as four levels of folders, which each level including one hundred folders. Although the hierarchy has defined or assigned the various folders of each level, one or more folders of the hierarchy may not be in existence if the one or more folders would otherwise be empty, and as such, the one or more folders of the hierarchy may be generated as needed to store a content item based at least in part on the hashed identifier. The content item may be automatically stored in a folder based at least in part on the hashed identifier. For example, the content item may be automatically stored in a folder at the lowest level of the hierarchy. As such, content items may be stored automatically throughout a directory structure in a randomized fashion in the various folders, in one embodiment, and, as a result, may be dispersed relatively equally throughout the directory structure. Accordingly, there may be no need to monitor or limit the number of files per directory, and the performance of the file system may be not affected. As such, a large number and/or amount of content items may be stored on a file system without comprising its performance. Some embodiments of the invention may provide for administration of access permissions to manage user submission of and/or access to content items in a container.

Although exemplary embodiments of the present invention may be described with respect to four levels of containers, other embodiments of the present invention may be equally applicable to any other number of levels of containers. Further, although exemplary embodiments of the present invention may be described with respect to identifying the hierarchy of containers based at least in part on certain elements of the hashed identifier, other embodiments of the present invention may be equally applicable to other elements of the hashed identifier. Additionally, although exemplary embodiments of the present invention may be described with respect to the elements of the hashed identifier presented in a certain order, other embodiments of the present invention may be equally applicable to the elements of the hashed identifier in other orders. Moreover, although exemplary embodiments of the present invention may be described with respect to the hashed identifier based at least in part on certain information associated with the request, other embodiments of the present invention may be equally applicable to other information which may or may not be associated with the request.

Figure 1:
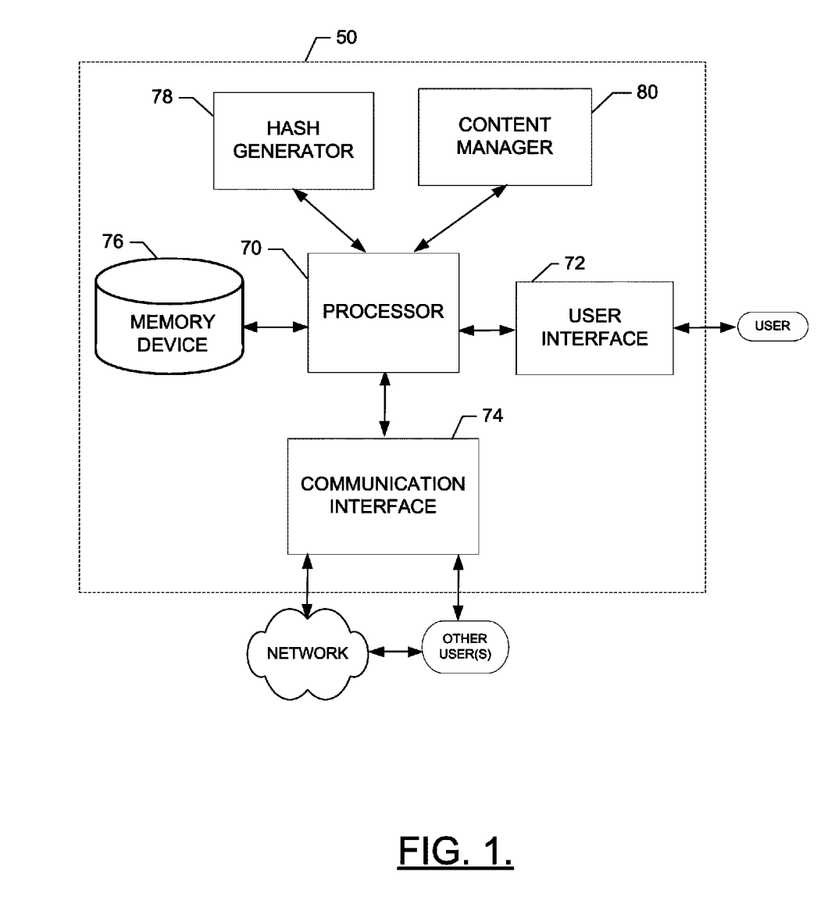
FIG. 1 illustrates a block diagram of a computing architecture suitable for practicing aspects of embodiments of the present invention.
Figure 4:
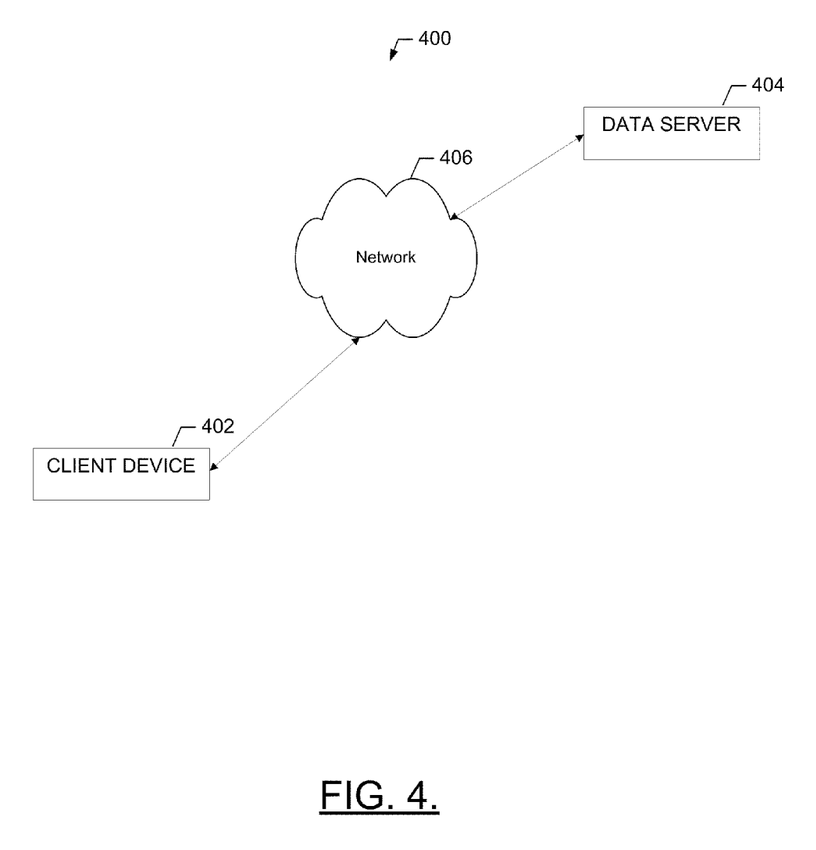
FIG. 4 illustrates a block diagram of a system for dispersing content according to an exemplary embodiment of the present invention.

An exemplary embodiment of the invention will now be described with reference to FIG. 1 illustrating a schematic block diagram of an apparatus for dispersing content items according to an exemplary embodiment of the present invention, in which certain elements of an apparatus 50 for dispersing content items are displayed. The apparatus 50 of FIG. 1 may be employed, for example, on the data server 404 or on the client device 402, as illustrated in FIG. 4 and further discussed below. However, the apparatus 50 may alternatively be embodied at a variety of other devices (such as, for example, personal computers, laptops, servers, communication devices (e.g., cellular telephones), personal digital assistants (PDAs), memory devices (e.g., external and/or internal hard disk drives), and/or the like, or any other suitable electronic device). In some cases, embodiments may be employed on a combination of devices. Accordingly, some embodiments of the present invention may be embodied wholly at a single device (e.g., the data server 404 or the client device 402), by a plurality of devices in a distributed fashion (e.g., split between the data server 404 and the client device 402) or by devices in a client/server relationship (e.g., the client device 402 and the data server 404). Furthermore, it should be noted that the devices or elements described below may not be mandatory and thus some may be omitted in certain embodiments. Additionally or alternatively, additional elements could also be added.

Referring now to FIG. 1, an apparatus for dispersing content items is provided. The apparatus 50 may comprise an architecture which may represent an architecture suitable for practicing aspects of embodiments of the present invention. Although not shown, the apparatus 50 may include means, such as a micro-controller/processor, digital signal processor (DSP), non-volatile memory, display, and/or transmit/receive unit (TX/RX), coupled to each other via a bus, which may be a single bus or an hierarchy of bridged buses. Further, non-volatile memory may include operating logic adapted to implement operations via, for example, any one of a number of programming languages, assembly, C, and/or the like. For example, in the illustrated embodiment, the apparatus 50 may include or otherwise be in communication with various means, such as a processor 70, memory device 76, communication interface 74, user interface 72, a random number generator (not shown), a hashed identifier 78, and a content manager 80 for performing the various functions herein described. The apparatus 50 may include or otherwise be in communication with a processor 70, a user interface 72, a communication interface 74 and a memory device 76.

These means of the apparatus 50 may communicate over a bus, and may be embodied as, for example, hardware elements (e.g., a suitably programmed processor, combinational logic circuit, and/or the like), computer code (e.g., software or firmware) embodied on a computer-readable medium (e.g. memory device 76) that is executable by a suitably configured processing device, or some combination thereof. The processor 70 may, for example, be embodied as various means including a microprocessor, a coprocessor, a controller, or various other processing elements including integrated circuits such as, for example, an ASIC (application specific integrated circuit) or FPGA (field programmable gate array). Accordingly, the processor 70 may comprise a microcontroller and/or a DSP. In an exemplary embodiment, the processor 70 may be configured to execute instructions stored in the memory device 76 or otherwise accessible to the processor 70. Although illustrated in FIG. 1 as a single processor, the processor 70 may comprise a plurality of processors operating cooperatively and/or in parallel, such as in a multi-processor system. These multiple processors may be embodied on a single computing device or may be distributed across multiple computing devices, such as, for example, a server cluster, rack of blade servers, or a distributed computing system.

The memory device 76 may include, for example, volatile and/or non-volatile memory, such as the non-volatile memory 406. The memory device 76 may be configured to buffer input data for processing by the processor 70. Additionally or alternatively, the memory device 76 may be configured to store instructions for execution by the processor 70. The memory device 76 may comprise one or more databases that store information in the form of static and/or dynamic information. The memory device 76 may store, for example, operating logic for applications, as well as content items such as, for example, text files, media files, multimedia files, applications, and/or the like. The memory device 76 may additionally or alternatively store content items, such as may be locally created and/or received from a remote device, such as from the data server 404. This stored information may be stored and/or used by the hash generator 78 and the content manager 80 during the course of performing their functionalities. The memory device 76 may also comprise a file system, which file system may include a directory structure that is capable of storing a large number and amount of content items without, in one embodiment, compromising of the performance of the file system and/or apparatus 50.

The communication interface 74 may be embodied as any device or means embodied in hardware, software, firmware, or a combination thereof that is configured to receive and/or transmit data from/to a network and/or any other device or module in communication with the client device 402. In one embodiment, the communication interface 74 may be at least partially embodied as or otherwise controlled by the processor 70. The communication interface 74 may include, for example, an antenna, a transmitter, a receiver, a transceiver and/or supporting hardware or software for enabling communications with other entities of the system 100, such as a data server 404 via the network 406. The communication interface 74 may be configured to receive and/or transmit data using any protocol that may be used for communications between the client device 402 and data server 404 over the network 406. The communication interface 74 may additionally be in communication with the memory device 76, user interface 72, the hash generator 78, and/or the content manager 80.

The user interface 72 may be in communication with the processor 70 to receive an indication of a user input and/or to provide an audible, visual, mechanical, or other output to the user. As such, the user interface 72 may include, for example, a keyboard, a mouse, a joystick, a display, a touch screen display, a microphone, a speaker, and/or other input/output mechanisms, and/or the like. In an exemplary embodiment in which the apparatus is embodied as a server or some other network devices, the user interface 72 may be limited, or eliminated. However, in an embodiment in which the apparatus is embodied as a communication device or other device capable of performing communication functions, the user interface 72 may include, among other devices or elements, any or all of a speaker, a microphone, a display, and a keyboard or the like. As such, the user interface 72 may further be in communication with the memory device 76, communication interface 74, the hash generator 78, and/or the content manager 80. In embodiments wherein the functions of the apparatus may solely be to receive requests associated with the content items (e.g., to store content items) and responding to such requests (e.g., storing content items), the user interface 72 may be limited or even eliminated.

In an exemplary embodiment, the processor 70 may be embodied as, include or otherwise control a hash generator 78 and a content manager 80. As such, the hash generator 78 and the content manager 80 may in some cases each be separate devices, modules, or functional elements. However, in other embodiments, some or all of the hash generator 78 and the content manager 80 may be embodied within a single device, module, or functional element, such as the processor 70. The hash generator 78 and the content manager 80 may each be any means such as a device or circuitry embodied in hardware, software or a combination of hardware and software (e.g., processor 70 operating under software control) that is configured to perform the corresponding functions of the hash generator 78 and the content manager 80, respectively, as described below. For example, the hash generator 78 and the content manager 80, individually or in combination, may include means for receiving a request associated with a content item, means for generating a hashed identifier based at least in part on the request associated with the content item, means for identifying a respective container within a hierarchy of one or more containers based at least in part on the hashed identifier, and storing the content item in one of the one or more containers based at least in part on the hashed identifier. In some embodiments, communication between any or all of the hash generator 78 and the content manager 80 may be conducted via the processor 70. However, some or all of the hash generator 78 and the content manager 80 may alternatively be in direct communication with each other.

In some embodiments, the hash generator 78 may be configured to receive one or more requests associated with one or more content items such as, for example, requests to create, modify, save, and/or view content items. In some examples, the hash generator may be configured to process the requests (e.g., generate a hashed identifier) immediately upon receipt of the request. In other examples, the hash generator may be configured to store the requests and thus process the requests (e.g., generate a hashed identifier) at some time after receiving the request. The one or more requests may be received simultaneously and/or sequentially and as such, the hash generator 78 may process the requests simultaneously and/or sequentially. The hash generator 78 may also be configured to control a random number generator. In this regard, the hash generator 78 may be configured to cause the random number generator (included in the apparatus 50, although not shown) to be activated and/or generate a random number. The random number may correspond to an internal count of the apparatus 50. For example, the hash generator 78 may be configured to cause the random number generator to be activated and generate a number when the apparatus 50 is powered on, or is returned to an active state from a stand-by or hibernating state. The hash generator may also be configured to cause the random number generator to increment its count. In some examples, the count may be incremented periodically (e.g., daily, hourly, every minute, second, etc). In other examples, the count may be incremented based at least in part upon receipt of a request, or other predetermined conditions or criteria which may be specified by a user and/or administrator of the apparatus, and/or the like.

The hash generator may be configured to identify and/or retrieve the address associated with the apparatus 50. For example, the address may be the address of the apparatus 50 at the time of the request. As used herein, the "time of the request" may be used to refer to the time the request was submitted, received, or processed. In embodiments where the apparatus 50 may be a mobile device, the device may be associated with different addresses based at least in part on the location of the device. As such, the address may be the address at the time of the request. In some examples, the hash generator may be configured to identify and/or retrieve the IP address associated with a device submitting the request. For example, referring to FIG. 4, the client 402 may submit a request to the data server 404. As such, the hash generator may be configured to identify and/or retrieve the address associated with the client device 402. Referring back to FIG. 1, the hash generator may be configured to modify the address. For example, the hash generator 78 may be configured to convert the IP address (associated with the apparatus 50 and/or other devices in communication with the apparatus 50) to its corresponding hexadecimal value. In some cases, the hash generator 78 may be configured to convert only the last two bytes of the address (or nay predetermined subset of bytes of the IP address) to hexadecimal values.

The hash generator may comprise an algorithm (e.g., a hash algorithm) that may be used to generate one or more hashed identifiers. In some embodiments, the hashed identifier may comprise information associated with the date and time of the request, and information associated with the apparatus 50 at the time of the request and/or the device submitting the request at the time of the request. For example, the hashed identifier may include the date of the request (e.g., the day, month, and year), the time of the request (e.g., the hour, minutes, seconds, and milliseconds), the address of the apparatus 50 at the time of the request and/or the address of the device submitting the request, and/or a count of the random number generator associated the apparatus 50 at the time of the request and/or the device submitting the request.

Figure 2:
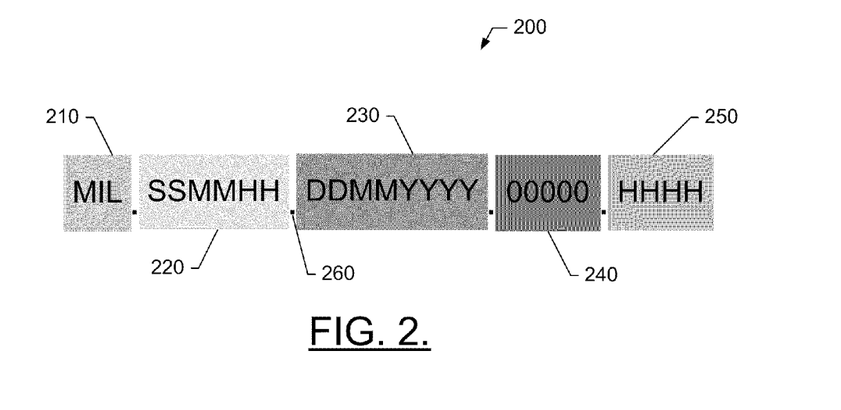
FIG. 2 is an exemplary embodiment of a hashed identifier according to an exemplary embodiment of the present invention.

In this regard, and referring now to FIG. 2, a hashed identifier 200 according to an exemplary embodiment of the present invention is provided. The hashed identifier 200 may include element 210 which may correspond to the milliseconds value at the time of the request, and element 220 which may correspond to the seconds, minutes and hours at the time of the request. The hashed identifier 200 may also include element 230 which may correspond to the day, month and year at the time of the request. The hashed identifier 200 may further include element 240 which may correspond to a thread safe count or the value or count of the random generator at the time of the request, and element 250 which may correspond to the hexadecimal value of the last two bytes of the IP address of the apparatus 50 at the time of the request or the IP address of the device submitting the request at the time of the request. The thread safe count may be included in the hashed identifier to handle situations when multiple requests are submitted at the time. As such, in the illustrated exemplary embodiment of the present invention, the hashed identifier 200 may comprise a concatenation of one more elements (e.g., milliseconds value; seconds, minutes and hours value; day, month and year; and/or the like). However, in other embodiments, the various elements of the hashed identifier may undergo a transformation (e.g., hash, encryption, encoding, and/or the like) based at least in part on a predefined algorithm (e.g., hash algorithm, encryption algorithm, encoding algorithm, and/or the like), and then concatenated. In some examples, each element of the hashed identifier 200 may be delimited by a character, such as, for example, a dot or period 260. The date and time information may be in various formats. For example, the time may be in "SSMMHH" and the date of the request may be in "DDMMYYYY" format. In some examples, the milliseconds may include three characters (e.g., digits), the thread safe count may include five characters (e.g., digits), and the IP address may include four characters. Although exemplary embodiments of the present invention may be described with respect to certain date and time formats, and certain number of characters for each element, other embodiments of the present invention may be equally applicable to other date and time formats, and other number of characters. As such, the hashed identifier may provide different and/or unique information for each request.

Referring back to FIG. 1, the content manager 80 may be configured to parse one or more hashed identifiers, for example, by using a parsing algorithm, and identify a hierarchy of one or more containers based at least in part on the parsed hashed identifiers. In some example, the content manager 80 may parse one or more identifiers simultaneously or sequentially based at least in part on the time of the request. For example, the directory structure of the apparatus may comprise a hierarchy of folders which may be organized as four levels of folders, with each level including up to one hundred folders. Accordingly, the directory structure of this example may include up to one hundred million possible folders whereon one or more content items may be stored. In some embodiments, the content item may be stored on the folder that is available (to receive additional content items) at the lowest level of the hierarchy, and each folder may store up to one thousand content items. Accordingly, the folders at the lowest level of the hierarchy may be the physical storage location of the content item. Based on the four level hierarchy with one hundred folders at each level and up to one thousand content items in each folder, the directory structure may store up to one hundred billion files. However, as mentioned, other embodiments of the invention may include more or less than four levels of folders, which may include more or less than one hundred folder at each level, and each folder may store more or less than one thousand content items. The folders may be identified by various identification methods such as, for example, numbers. For example, each folder of a level may be numbered from "00" to "99". In some embodiments, the hierarchy of one or more containers may be identified based at least in part on the elements corresponding to the milliseconds and thread count values of the hashed identifier. In other embodiments, the hierarchy of one or more containers may be identified based at least in part one or more additional or other elements of the hashed identifier.

Figure 3:
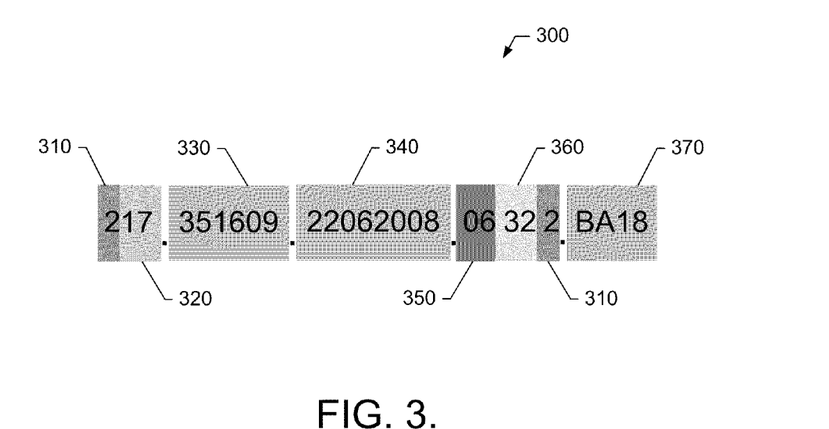
FIG. 3 is an exemplary embodiment of a hashed identifier according to an exemplary embodiment of the present invention.

In this regard, referring now to FIG. 3, an exemplary embodiment of a hashed identifier 300 according to an exemplary embodiment of the present invention is provided. The hashed identifier may have been generated in response to a request associated with a content item. As such, the date and time of this request (e.g., to store or create a content item) was Jun. 22, 2006 at 9:16 35 s and 217 milliseconds. The hexadecimal value of the last two bytes of the IP address was BA18 and the thread safe count (e.g., the value or count of the random number generator at the time of the request) was 06332. Elements 330, 340 and 370 which may correspond to the time, the date, and the IP address, may be used to provide a unique identification to the content item. The hashed identifier 300 may be parsed to identify the hierarchy of containers whereon the content item may be stored. In this regard, element 320, which may comprise of the last two digits of the millisecond value, may be used to identify or determine the folder on the first level of the hierarchy, in this example, folder 22. Elements 310, which may comprise of the first digit of the millisecond value and last digit of the thread safe count, may be used to identify or determine the folder on the second level, in this example, folder 17. Element 360, which may comprise of the third and fourth digits of the thread safe count, may be used to identify or determine the folder on the third level, in this example, folder 32. Element 350, which may comprise of the first two digits of the thread safe count, may be used to identify or determine the folder on the fourth level, in this example, folder 06.

As such, according to one embodiment, the folders may be identified or determined in order based at least in part on the levels of the hierarchy. For example, the folder on the first level may first be identified or determined, followed by the folder on the second level, the third level, and the fourth level. In other embodiments, the order may be reverse. In yet other embodiments, the order may be arbitrary. As mentioned above, the content item (e.g., physical file) may be physically stored on the designated folder on the last or lowest level of the hierarchy that may have availability to receive an additional content item (e.g., the folder that has not yet reached a capacity as defined by the threshold or limit). According, in this example, the content item may be stored in folder 06. In some embodiments, the hashed generator 78 may be configured to determine whether the designated folder on the last or lowest level of the hierarchy has availability to receive an additional content item. As such, if the hashed generator 78 determines that the designated folder has no availability to receive an additional content item, in some examples, the hashed generator 78 may cause an new hashed identifier to be determined based at least in part on the time a determination was made that the designated folder has no availability to receive an additional content item. In other examples, the hashed generator 78 may replace the value of the thread safe count in the current hashed identifier to be replaced with a new value of the thread safe count (e.g., a value at the time a determination was made that the designated folder has no availability to receive an additional content item, the current value of the thread safe count, etc.). Accordingly, content items may be randomly dispersed throughout the filing system based at least in part on the hashed identifier. As such, the risk of overpopulating a directory may be avoided and content items may be equally distributed across multiple physical locations. The thread safe count may be used in the hashed identifier to further randomize and equally disperse content items throughout the filing system. Accordingly, a large number and amount of files may be stored on the file system without negatively affecting the performance of the file system and/or apparatus 50.

Referring back to FIG. 1, in some examples, the content manager 80 may be configured to cause the content item to be stored on the identified folder on the lowest level. The content manager 80 may also be configured to generate one or more containers if they are not already in existence on the directory structure of the file system. In the example of FIG. 3 for instance, the folder may not exist on the directory structure if no content items have been previously stored in the folder and, as such, the content manager 80 may be configured to create folder 17, as well as folders 22, 32, and 06 whereon the content item may be stored. As such, the content manager 80 may be configured to generate a multileveled hierarchy of one or more containers. The content manager 80 may also be configured to generate a path indicative of the location of the content item based at least in part on the hashed identifier. For example, based on the hashed identifier 300 of FIG. 3, the path to the content item may be "<some root folder>\17\22\32\06\351609.22062008.47640.0_0_0_1_invoice85.doc". In this regard, the content manager 80 may be configured to generate a unique identifier to the content item based at least in part on the time and date at the time of the request, IP address at the time of the request, and/or the original identifier of the content item. In this example, "\17\22\32\06\" may correspond to the folders at the different levels, "351609" may correspond to the time of the request, "22062008" may correspond to the date at the time of the request, "47640" may correspond to the last two bytes of the IP address at the time of the request, and "0_0_1_invoice85.doc" may correspond to the identifier (e.g., a file name) of the content item when originally submitted. As such, in the event a request is submitted to store two content items having the same names, a unique identifier may be generated for each content item. Accordingly, even if the two content items are stored in the same folder, one may readily be identified and differentiated from the other. In this example, a request may be have been submitted to store a content item identified as "0_0_1_invoice85.doc". In this regard, the content item may be a Word document. In some examples, the last two bytes of the IP address may be converted from decimal to hexadecimal. In other examples, the last two bytes of the IP address may be converted from hexadecimal to back to decimal. The content manager 80 may also be configured to provide for display of the path (e.g., after the content item has been stored in the designated folder). The content manager 80 may further be configured to retrieve and provide for display of content items, such as upon user requests. In some embodiments, the content manager 80 may be configured to keep a record the content items in a data structure, such as for example, a database on memory device 76. As such, the content manager 80 may be configured to generate a record in a table of the database including information associated with the content item, such as, for example, a path to the content item, its physical location, its unique identifier, and/or the like. The content manager may also be configured to perform the administration of access permissions to manage user submissions of requests and/or access to content items in a container.

FIG. 4 illustrates a block diagram of a system 400 for dispersing content items according to an exemplary embodiment of the present invention. It will be appreciated that the scope of the invention encompasses many potential embodiments in addition to those illustrated and described herein. As such, while FIG. 4 illustrates one example of a configuration of a system for dispersing content items, numerous other configurations may also be used to implement embodiments of the present invention. The system 400 may include a client device 402 and data server 404 configured to communicate over a network 406. As such, content items may be transferred between the client device and the data server. In other words, the data server 404 may send content items to and receive content items from the client device 402, and vice versa. For example, the client device 402 may send a request to the data server 404 to store a content item, and the data server may 404 may process the request as discussed above. The client device 402 may be embodied as any computing device, mobile or fixed, and may be embodied as a server, desktop computer, laptop computer, mobile terminal, and/or the like configured to communicate with the data server 404 over the network 406. The data server 404 may be embodied as any computing device or plurality of computing devices configured to provide (e.g., for display), store, and/or modify content items in response to one or more client device 402 requests over a network 406. In this regard, the data server 404 may be embodied, for example, as a server cluster, rack of blade servers, and/or may be embodied as a distributed computing system, such as may be distributed across a plurality of computing devices. In some embodiments, the data server 404 may be a web server. Although referred to herein as a "server," it will be appreciated that the data server 404 may be embodied as a computing device other than a server. Further, although only a single client device 402 and data server 404 are illustrated in FIG. 4, the system 100 may comprise a plurality of client devices 402 and data servers 404.

The network 406 may comprise any network over which the client device 402 and data server 404 are configured to communicate. Accordingly, the network 406 may comprise one or more public and/or private wireless networks, wireline networks, or any combination thereof, and in some embodiments may comprise the Internet. The network 406 may further comprise a structured network, ad hoc network, or some combination thereof. The network 406 may further utilize any communications protocol or combination of communications protocols that may facilitate inter-device communication between the client device 402 and data server 404. In turn, other devices such as processing elements (e.g., personal computers, server computers, and/or the like) may be coupled to the client device 402 and/or the data server 404 via the network 406. By directly or indirectly connecting the client device 402 and/or the data server 404, and other devices to the network 406, the client device 402 and/or the data server 404 may be enabled to communicate with the other devices, for example, according to numerous communication protocols including Hypertext Transfer Protocol (HTTP) and/or the like, to thereby carry out various communication or other functions of the client device 402 and/or the data server 404.

Figure 5:
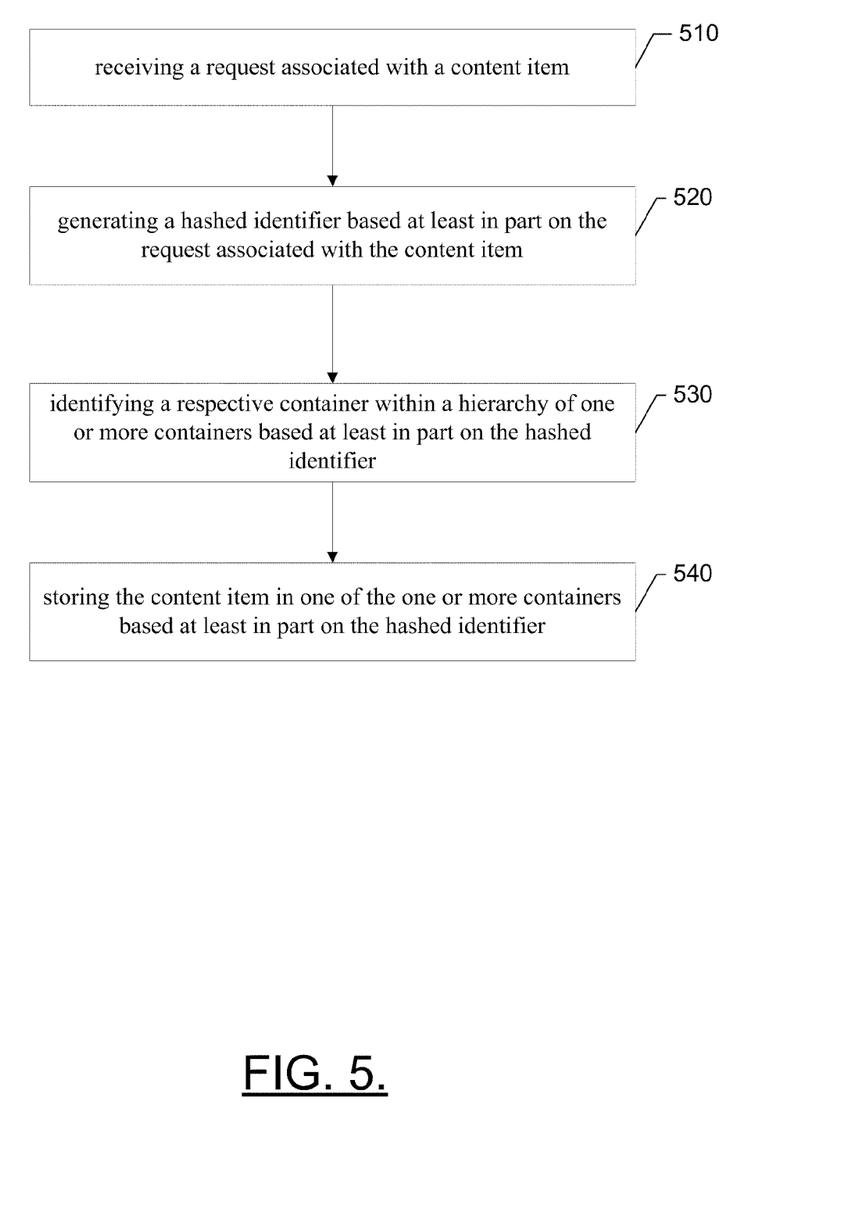
FIG. 5 illustrates a flowchart according to an exemplary method for dispersing content items according to an exemplary embodiment of the present invention.

FIG. 5 is a flowchart of a system, method, and computer program product according to an exemplary embodiment of the invention. It will be understood that each block or step of the flowcharts, and combinations of blocks in the flowcharts, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal, server, apparatus, other computing device and/or the like and executed by a processor in the computing device. In some embodiments, the computer program instructions which embody the procedures described above may be stored by memory devices of a plurality of computing devices. As will be appreciated, any such computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer instructions.

In this regard, one exemplary method for dispersing content items according to an exemplary embodiment of the present invention is illustrated in FIG. 5. The method may include receiving a request associated with a content item at operation 510, and generating a hashed identifier based at least in part on the request associated with the content item at operation 520. The method may further include identifying a respective container within a hierarchy of one or more containers based at least in part on the hashed identifier, and storing the content item in one of the one or more containers based at least in part on the hashed identifier.

In some embodiments, certain ones of the operations above may be modified or further amplified as described below. It should be appreciated that each of the modifications or amplifications below may be included with the operations above either alone or in combination with any others among the features described herein. In this regard, for example, storing the content item may include storing the content item on a lowest level of the hierarchy of one or more containers. In some examples, receiving a request associated with the content item may include receiving at least one of a request to generate the content item or a request to save the content item. In some embodiments, identifying a respective container within a hierarchy of one or more containers based at least in part on the hashed identifier may include generating at least one container based at least in part on the hashed identifier. In some examples, generating at least one container based at least in part on the hashed identifier may include determining the existence of the at least one container and generating the at least one container if the container does not exist.

In some embodiments, generating a hashed identifier may include generating a hashed identifier comprising at least one of a date associated with the request, a time associated with the request, a first identifier associated with a device processing the request, or a second identifier associated with a device processing the request. In some cases, identifying a respective container may include generating a hierarchy of one or more containers based at least in part on at least one of the time associated with the request or a count associated with the device. In other cases, generating a hashed identifier comprising at least one of a first identifier associated with a device may include generating a hashed identifier comprising at least one of an Internet protocol (IP) address associated with the device. In some situations, generating a hashed identifier may include generating a hexadecimal value corresponding to the IP address.

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

In an exemplary embodiment, an apparatus for performing the method of FIG. 5 above may comprise a processor (e.g., the processor 70) configured to perform some or each of the operations (510-540) described above. The processor may, for example, be configured to perform the operations (510-540) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-540 may comprise, for example, the processor 70, respective ones of the hash generator 78 and the content manager 80, or an algorithm executed by the processor for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method comprising:
receiving a request associated with a content item, wherein the content item comprises at least one of a file or an application;
generating a hashed identifier based at least in part on the request associated with the content item with the hashed identifier including a representation of one or more attributes of the request, wherein generating a hashed identifier comprises generating a hashed identifier comprising: (1) at least one of a date of the request or a time of the request, and (2) a thread safe count, wherein the hashed identifier comprises a plurality of elements with each element, other than the thread safe count, being dependent upon a time of the request associated with the content item;
identifying a specific container within a hierarchy of one or more containers based at least in part on the hashed identifier, wherein the containers comprise respective storage locations, and wherein identifying the specific container comprises parsing the hashed identifier to identify the hierarchy organized as a plurality of levels that each include one or more containers and identifying the specific container on a particular level within the hierarchy based at least in part upon the hashed identifier following the parsing; and
storing the content item in one of the one or more containers based at least in part on the hashed identifier.

2. The computer-implemented method of claim 1, wherein storing the content item comprises storing the content item on a lowest level of the hierarchy of one or more containers.

3. The computer-implemented method of claim 1, wherein receiving a request associated with the content item comprises receiving at least one of a request to generate the content item or a request to save the content item.

4. The computer-implemented method of claim 1, wherein identifying a respective container comprises generating a hierarchy of one or more containers based at least in part on at least one of the time associated with the request or the count associated with the device.

5. The computer-implemented method of claim 1, wherein generating a hashed identifier comprises generating a hashed identifier comprising at least one of an Internet protocol (IP) address associated with the device.

6. The computer-implemented method of claim 5, wherein generating a hashed identifier comprises generating a hexadecimal value corresponding to the IP address.

7. The computer-implemented method of claim 1, wherein identifying a respective container based at least in part on the hashed identifier comprises generating at least one container based at least in part on the hashed identifier.

8. The computer-implemented method of claim 7, wherein generating at least one container based at least in part on the hashed identifier comprises determining the existence of the at least one container and generating the at least one container in an instance in which the container does not exist.

9. The method of claim 1, wherein the plurality of elements that comprise the hashed identifier include one or more representations of the time of the request, at least a portion of an Internet Protocol (IP) address of a device submitting or processing the request at the time of the request and the thread safe count.

10. The method of claim 9, wherein the one or more representations of time comprise a first element corresponding to milliseconds at the time of the request, a second element corresponding to seconds, minutes and hours at the time of the request and a third element corresponding to a day, month and year at the time of the request.

11. The method of claim 9, wherein at least a portion of the IP address of the device comprises a subset of bytes of the IP address.

12. A computer program product comprising at least one computer-readable storage medium having computer-executable program code instructions stored therein, the computer-executable program code instruction comprising:
   program code instructions for program instruction for receiving a request associated with a content item, wherein the content item comprises at least one of a file or an application;
   program code instructions for generating a hashed identifier based at least in part on the request associated with the content item with the hashed identifier including a representation of one or more attributes of the request, wherein the program code instructions for generating a hashed identifier comprise program code instructions for generating a hashed identifier comprising: (1) at least one of a date of the request or a time of the request, and (2) a thread safe count, wherein the hashed identifier comprises a plurality of elements with each element, other than the thread safe count, being dependent upon a time of the request associated with the content item;
   program code instructions for identifying a specific container within a hierarchy of one or more containers based at least in part on the hashed identifier, wherein the containers comprise respective storage locations, and wherein the program code instructions for identifying the respective container comprise program code instructions for parsing the hashed identifier to identify the hierarchy organized as a plurality of levels that each include one or more containers and program code instructions for identifying the specific container on a particular level within the hierarchy based at least in part upon the hashed identifier following the parsing; and
   program code instructions for storing the content item in one of the one or more containers based at least in part on the hashed identifier.

13. The computer program product of claim 12, wherein program code instructions for storing the content item includes program code instructions for storing the content item on a lowest level of the hierarchy of one or more containers.

14. The computer program product of claim 12, wherein program code instructions for receiving a request associated with the content item includes program code instructions for receiving at least one of a request to generate the content item or a request to save the content item.

15. The computer program product of claim 12, wherein program code instructions for identifying a respective container includes program code instructions for generating a hierarchy of one or more containers based at least in part on at least one of the time associated with the request or the count associated with the device.

16. The computer program product of claim 12, wherein program code instructions for generating a hashed identifier includes program code instructions for generating a hashed identifier comprising at least one of an Internet protocol (IP) address associated with the device.

17. The computer program product of claim 16, wherein program code instructions for generating a hashed identifier includes program code instructions for generating a hexadecimal value corresponding to the IP address.

18. The computer program product of claim 12, wherein program code instructions for identifying a respective container based at least in part on the hashed identifier includes program code instructions for generating at least one container based at least in part on the hashed identifier.

19. The computer program product of claim 18, wherein program code instructions for generating at least one container based at least in part on the hashed identifier includes program code instructions for determining the existence of the at least one container and generating the at least one container in an instance in which the container does not exist.

20. An apparatus comprising a processor configured to:
   receive a request associated with a content item, wherein the content item comprises at least one of a file or an application;
   generate a hashed identifier based at least in part on the request associated with the content item with the hashed identifier including a representation of one or more attributes of the request, wherein the processor is configured to generate a hashed identifier by generating a hashed identifier: (1) at least one of a date of the request or a time of the request, and (2) a thread safe count, wherein the hashed identifier comprises a plurality of elements with each element, other than the thread safe count, being dependent upon a time of the request associated with the content item;
   identify a specific container within a hierarchy of one or more containers based at least in part on the hashed identifier, wherein the containers comprise respective storage locations, and wherein the processor is configured identify the specific container by parsing the hashed identifier to identify the hierarchy organized as a plurality of levels that each include one or more containers and by identifying the specific container on a particular level within the hierarchy based at least in part upon the hashed identifier following the parsing; and
   store the content item in one of the one or more containers based at least in part on the hashed identifier.

21. The apparatus of claim 20, wherein the processor configured to store the content item comprises the processor configured to storing the content item on a lowest level of the hierarchy of one or more containers.

22. The apparatus of claim 20, wherein the processor configured to receive a request associated with a content item comprises the processor configured to receive at least one of a request to generate the content item or a request to save the content item.

23. The apparatus of claim 20, wherein the processor configured to identify a respective container comprises the processor configured to generate a hierarchy of one or more containers based at least in part on at least one of the time associated with the request or the count associated with the device.

24. The apparatus of claim 20, wherein the processor configured to generate a hashed identifier comprises the processor configured to generate a hashed identifier comprising at least one of an Internet protocol (IP) address associated with the device.

25. The apparatus of claim 24, wherein the processor configured to generate a hashed identifier comprises the processor configured to generate a hexadecimal value corresponding to the IP address.

26. The apparatus of claim 20, wherein the processor configured to identify a respective container based at least in part on the hashed identifier comprises the processor configured to generate at least one container based at least in part on the hashed identifier.

27. The apparatus of claim 26, wherein the processor configured to generate at least one container based at least in part on the hashed identifier comprises the processor configured to determine the existence of the at least one container and generate the at least one container in an instance in which the container does not exist.

* * * * *